United States Patent [19]

Saligny

[11] Patent Number: 4,781,613

[45] Date of Patent: Nov. 1, 1988

[54] CONNECTION UNIT FOR TELEPHONE LINE

[75] Inventor: Yves Saligny, Thyez, France

[73] Assignee: Etablissements Carpano & Pons, France

[21] Appl. No.: 28,035

[22] Filed: Mar. 18, 1987

Related U.S. Application Data

[63] Continuation of Ser. No. 492,412, May 6, 1983, abandoned.

[30] Foreign Application Priority Data

May 7, 1982 [FR] France .................. 82 08389

[51] Int. Cl.⁴ .......................................... H01R 11/20
[52] U.S. Cl. ...................................... 439/391; 439/709
[58] Field of Search ............... 339/97 R, 97 P, 98, 339/99 R, 18 R, 18 C, 18 P, 18 B, 19, 111; 179/98

[56] References Cited

U.S. PATENT DOCUMENTS

| | | | |
|---|---|---|---|
| 3,760,328 | 9/1973 | Georgopulos | 179/98 |
| 4,106,837 | 8/1978 | Paluch | 339/98 |
| 4,159,500 | 6/1979 | Baumbach et al. | 179/98 |
| 4,313,147 | 1/1982 | Uchida et al. | 179/98 |
| 4,328,524 | 5/1982 | Nozick | 179/98 |
| 4,345,294 | 8/1982 | Forberg et al. | 179/98 |

Primary Examiner—Eugene F. Desmond
Attorney, Agent, or Firm—Darby & Darby

[57] ABSTRACT

This connection unit for telecommunication lines comprises a sequence of insulating connection boxes and protection boxes alternating side by side on a pair of common transverse supports. Each connection box comprises at least two rows of connection elements with one row disposed along one side of the box and oriented in the direction of the common supports and the other row disposed along the side opposite the first side. Each protection box supports aligned lightning arresters. The means interconnecting each connection box and the protection box associated therewith are provided in the vicinity of one of the two opposite sides of the connection box, and in the vicinity of the registering side of the protection box. The individual means for positioning and securing the connection boxes and the protection boxes on their common supports are identical, whereby it is possible to replace a protection box with a connection box.

6 Claims, 4 Drawing Sheets

CONNECTION UNIT FOR TELEPHONE LINE

This is a continuation of application Ser. No. 492,412 filed May 6, 1983, now abandoned.

BACKGROUND OF THE INVENTION

1. Field of the Invention

The present invention relates to connection units for telecommunication lines, consisting of a range of insulating boxes disposed side by side on at least one common support extending across said boxes. Each box comprises at least two rows of connection elements disposed the one along the side of said box which is oriented in the direction of said common support, the other along the side opposite the first side. Internal connection means are provided for interconnecting each connection element of one row and the registering connection element of the other row. Corresponding protection means consisting for example of fuses or lightning arresters are adapted to be disposed in proper alignment along said internal connection means.

2. THE PRIOR ART

In hitherto known connection units of this character, such as the unit described and illustrated in the French Pat. No. 2,440,636, the protection means are disposed by pairs within the protection modules. These protection modules are enclosed in cells provided in each insulating box, along the rows of connection elements. However, a connection box of this type is objectionable for, even when it is desired to use it without protection means, i.e. by removing the modules therefrom, its overall dimensions remains unchanged and therefore maximal. Moreover, the evolution with time of the protection means is prevented since the volume of the cells provided for receiving the protection modules is fixed once for all. To change this volume, it would be necessary to change the insulating box, thus precluding any possibility of standardizing these insulating boxes.

SUMMARY OF THE INVENTION

The connection unit for telecommunication lines according to the present invention is characterized in that it comprises at least one "protection" box separate from the "connection" insulating box having rows of connection elements disposed on its two opposite sides, respectively, said protection box being disposed between the connection box with which it is associated and the next connection box. Means for interconnecting each protection box and the corresponding connection box are provided in the vicinity of one of the two opposite sides of the connection box and in the vicinity of the registering side of the protection box.

In a typical form of embodiment, the connection boxes and the protection boxes are provided with separate means for positioning and fastening them to their common support, said means being identical and equidistant, the dimensions of the two types of boxes, measured in a direction parallel to the common support, being such that the two types are interchangeable. According to a different form of embodiment of the invention, the box positioning and fastening means, the connection and protection means, are identical, these two types of boxes being stacked alternatively against each other. In a further form of embodiment, each protection box is secured only to the connection box associated therewith.

In certain modified forms of embodiment wherein the connection elements of at least one side of the connection box consist of selfstripping plugs, the connection means between each connection box and the protection box associated therewith consist of conductors of very varied types, for example electric wire sections, possibly cut conducting elements, or the like. Each conductor is connected on the one hand to one of the self-stripping connection plugs of the connection box, on the other hand to at least one of the self-stripping connection plugs registering with the other plug on the protection box and oriented in the same direction as said other plug. According to a typical form of embodiment, each conductor consists of the endmost portion of a connecting wire for connecting the load network to the connection unit. In a different form of embodiment, the conductor consists of a wire section, formerly an integral part of the endmost section of a connection wire adapted to connect the load network to the connection unit, before being cut off from the remaining portion of said endmost section, after connecting the whole of this endmost section to the two associated connection and protection boxes.

In a modified form of embodiment, the means for interconnecting the connection box and the protection box associated therewith consist of U-shaped conducting elements of which one arm is introduced into an inlet orifice provided for this purpose laterally of each connection element of the connection box, and adapted to cooperate with internal connection means provided between the corresponding connection elements of the two rows, the other arm of the U-shaped conducting element being connected to the corresponding protection means incorporated in the protection box.

In a further form of embodiment similar to the preceding one the first arm of each U-shaped conducting element is not introduced into an inlet orifice provided for this purpose laterally of each connection element, but cooperates directly with a connection element.

In a modified version of the two forms of embodiment described in the last two paragraphs hereinabove, a plurality of U-shaped conductors are supported by a single insulating box adapted to cover simultaneously the corresponding and respective sides of the connection box and of the corresponding protection box. In another modified version, this single insulating box is rigid with the corresponding protection box and constitutes the means for securing this protection box to the connection box.

With the present invention it is possible to provide a connection unit in which the insulating boxes incorporating rows of connection elements disposed on their two opposite sides respectively remain standard boxes irrespective of the overall dimensions of the protection means implemented which may thus change with time and be adapted to each specific application contemplated. On the other hand, it is possible, by using the same insulating boxes, to provide either a connection unit with its protection means, for coupling same to the end of a cable, or a connection strip without protection, adapted to interconnect subscribers' lines and having the same volume and a capacity of approximately twice the preceding capacity, the passage from the first case to the second case being accomplished very easily and simply.

THE DRAWINGS

DESCRIPTION OF THE PREFERRED EMBODIMENTS

Figure 1:
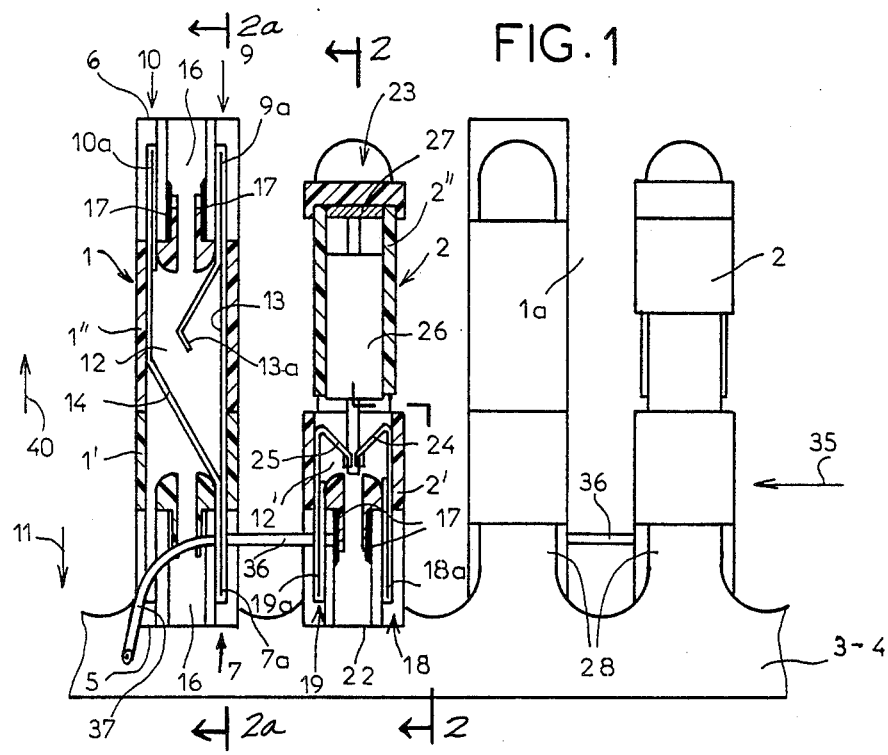
FIG. 1 illustrates in fragmentary section taken along the line 1—1 of FIG. 2 a first form of embodiment of the invention.
Figures 2, 2A:
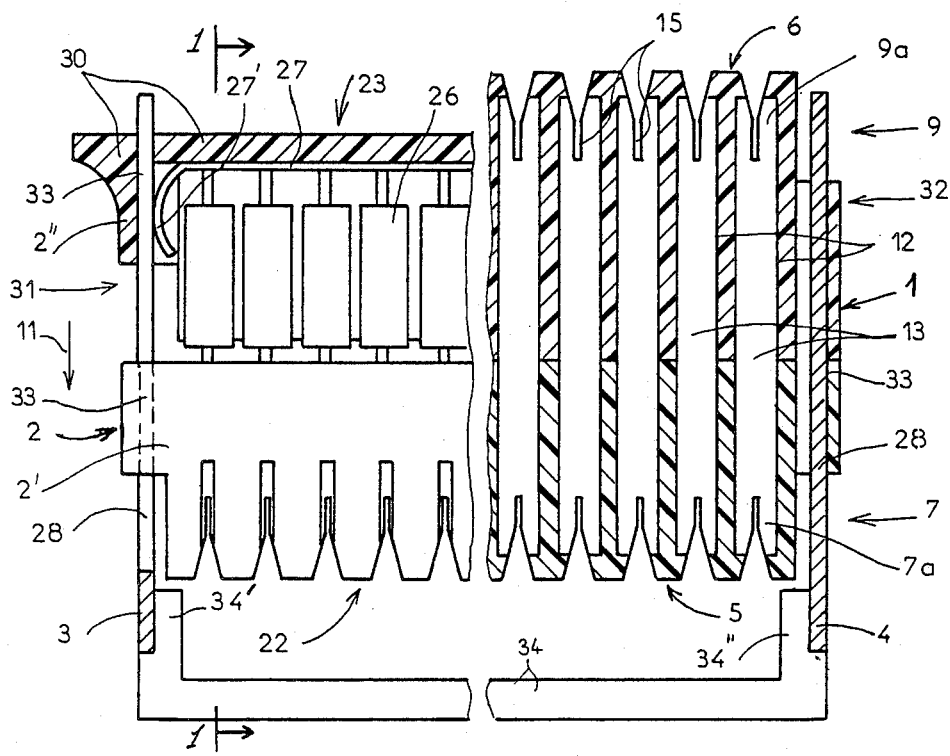
FIG. 2 illustrates in fragmentary section taken along the line 2—2 of FIG. 1 the same first form of embodiment of the invention.
FIG. 2a illustrates in fragmentary section taken along the line 2a-2a of FIG. 1 the same first form of embodiment of the invention.

As illustrated in FIGS. 1 and 2 of the drawings, the connection unit according to the invention comprises a sequence of alternate insulating boxes 1 and 2 disposed side by side on a pair of common supports 3 and 4 extending at right angles to said boxes. The boxes 1 are connection boxes comprising each, in the example illustrated in FIGS. 1 and 2 and 2a, three rows 7, 9, 10 of connection elements consisting for example of identical connection plugs 7a, 9a, 10a, respectively. The first row 7 extend along the side 5 of said box 1 oriented as shown by the arrow 11 towards the two common supports 3 and 4. The two last rows 9, 10 extend in parallel relationship along the side of said box 1 which is opposite the first side 5. The first and second rows 7 and 9 are coplanar. The fourth position for a row of plugs 8a is left free, in this example, on the side 5 of box 1, parallel to row 7.

Each insulating connection box 1, in addition to the rows of connection plugs, incorporates internal connection means disposed on the one hand between each plug 91 of a row 9 and the plug 10a of the opposite row 10, and on the other hand the opposite plug 7 of the other row 7a. In this example, said internal connection means, for each group of plugs 7a, 9a, 10a, are housed in a separate passage 12 extending throughout the box 1 from side 5 and side 6 thereof. They consist, for example, of a conducting blade 13 interconnecting plug 7a and plug 9a, and a resilient bent extension 13a of this blade 13 extending substantially along the axis of said passage 12. Another conducting blade 14 interconnects the same plug 7a and plug 10a.

The connection plugs 7a, 9a and 10a are for example self-stripping plugs of the type comprising a narrow longitudinal slit 15 (FIG. 2a) for receiving a conducting wire retained therein by clamping. Cutting blades 17 are provided laterally along the plugs 9a and 10a, for cutting the endmost portion of the conducting wires when these wires are inserted into the corresponding slits 15. None of these cutting blades 17 is provided along the first plugs 7a in this specific form of embodiment.

Between the two rows 9 and 10 of plugs a row of access holes 16 are provided. The same row of access holes is provided between the row 7 and the location of a possible subsequent row. The access holes 16 remain inoperative in the present form of embodiment. The connection boxes 1 are advantageously made of two interfitting sections 1' and 1".

The other boxes 2 are so-called "protection" boxes. They are likewise advantageously made of two interfitting sections 2' and 2". Section 2' is an insulating section and comprises two parallel rows 18 and 19 of connection plugs 18a and 19a, respectively, identical for example with plugs 7a, 9a and 10a, and disposed along the side 22 of said box 2 which is oriented in the direction of the arrow 11 like the above-mentioned side 5. A cutting blade 17 is associated with each plug. Plugs 18a, 19a registering by pairs with each other comprise resilient conducting extensions 24 and 25, respectively, bent toward each other and enclosed in a passage 12' similar to passage 12.

The other section 2" incorporates a row of protection elements, for example lightning arresters 26. A first end of each element is clamped between the two extensions 24, 25. The other end of each lightning arrester 26 bears against a common earthing blade 27 parallel to the second side 23 opposite the first side 22 inside the second section 2" of box 2 which is essentially a metallic section electrically connected to said blade 27. The bodies of lightning arresters 26 contact directly the inner walls of this second metal section 2". The upper portion 30 of the same second section 2" consists of a suitable insulating material and is shaped to facilitate the gripping thereof.

Each protection box 2 is disposed between the connection box 1 associated therewith and the next connection box 1a (FIG. 1). All the connection boxes 1 and all the protection boxes 2 constituting a same and common connection unit comprise separate means for positioning and fastening them on and to the two common transverse supports 3 and 4 which, in this example, is made from a suitable conducting material. Said positioning and fastening means consist in this case of equidistant parallel conducting extensions 28 extending at right angles to the common supports 3 and 4 of which they are an integral part. All the connection boxes 1 and all the protection boxes 2 comprise at their opposite ends 31, 32 (FIGS. 2 and 2a) a passage 33 parallel to passages 12, 12', respectively. These passages 33 are exactly dimensioned to permit the ingress of said conducting extensions 28 so that they can be fitted on said extensions in the direction of the arrow 11. When the two sections 2'0 and 2" of a protection box 2 are thus assembled, the endmost portions of the two extensions 28 for positioning and fixing the box engage the two opposite ends, respectively, which are bent for this purpose at 27' (FIG. 2), of the corresponding earthing blade 27. Each connection box 1 is fitted in the same manner on the two extensions 28.

The two common conducting supports 3 and 4, which are parallel to each other, are rigid with the two arms 34' and 34" of a U-shaped trough 34.

The dimensions of the two types of boxes 1 and 2, respectively, measured in a direction 35 parallel to the common supports 3 and 4, are such that one type can be substituted at will for another type on said common supports 3 and 4.

In the present form of embodiment the connection means between each connection box 1 and the protection box 2 associated therewith consist of the end portions 36 of connecting wires 37 provided for coupling the connection unit to the load network. Each end portion 36 is connected on the one hand to a self-stripping connection plug 7a of connection box 1 and on the other hand to a self-stripping connection plug 19a connected to the corresponding lightning arrester 26 registering with the plug 7a on the relevant protection box 2. Said end portions 36 are retained by clamping in the self-stripping plugs 7a and 19a after introducing them in the direction opposite to 11.

It will be seen that in this specific version of the first form of embodiment the connecting wire 37 is firstly inserted through the plug 7a of connection box 1 before attaining plug 18a. Consequently, even when the second section 2" of protection box 2 containing the lightning arresters 26 is removed, the electrical continuity is maintained between each plug 7a and the corresponding two plugs 9a and 10a. An additional advantageous feature characterizing this form of embodiment lies in the fact that the electrical connection is obtained between the two associated boxes 1 and 2 without resorting to additional contacts between the two boxes.

It is easy to unplug a protection box 2 in the direction of the arrow 40 by simultaneously disconnecting the end portions 36 of the wires from the plugs 19a, and to substitute another connection box 1 therefor.

Figure 3:
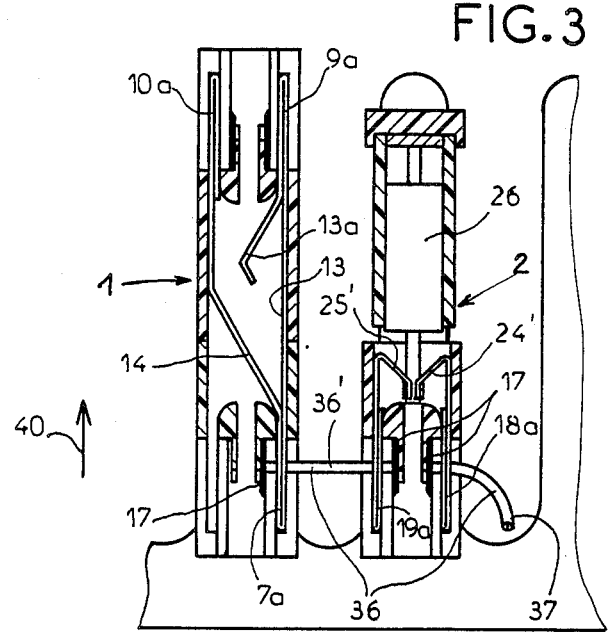
FIG. 3 is a section similar to FIG. 1 showing a modified version of the first form of embodiment.

The modified version of the above-described form of embodiment, shown in FIG. 3, is nearly completely identical with the first form of embodiment. It comprises in addition cutting blades 17 associated with the connection plugs 7a. The connection means between the protection box 2 and connection box 1 consist of wire sections 36' each of which is an end portion 36 of a connecting wire 37 provided for connecting the load network to the connection unit. Each section 36' is separated from the remaining portion of said end section 36 by the cutting action of blade 17, after connecting the whole of this wire section 36 to both associated connection and protection boxes 1, 2. In fact, in this modified form of embodiment each wire section 36' is connected on the one hand to a self-stripping connection plug 7a and on the other hand to a self-stripping connection plug 19a connected to the corresponding lightning arrester 26. The remaining portion of each end section 36 is connected to the corresponding self-stripping connection plug 18a of the protection box 2.

It will be seen that in this modified version each connecting wire 36 passes firstly through plugs 18a and 19a of protection box 2, before attaining the plug 7a of the other box. The continuity between each terminal 18a and the corresponding terminal 19a is obtained through resilient electrical conductor extensions 24', 25' and one end of the corresponding lightning arrester 26. The aforesaid extensions 24', 25' differ from extensions 24, 25 in that they do not contact each other when the lightning arrester 26 is removed. Thus, when the lightning arrester 26 is removed, the electrical continuity is no more available on the lines between each plug 18a and each plug 9a or 19a.

Figure 4:
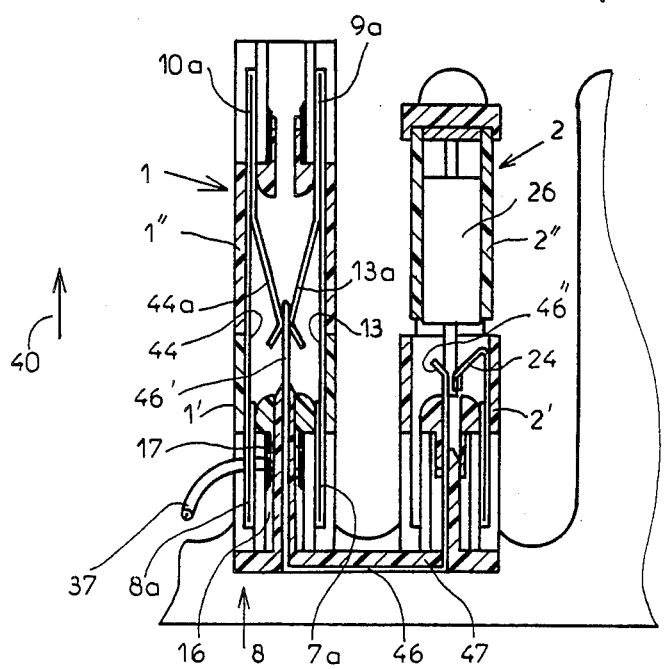
FIG. 4 is a section similar to FIG. 1 but showing a second form of embodiment of the invention.

In the second form of embodiment illustrated in FIG. 4 the conducting blade 14 of connection box 1 of the first form of embodiment (FIGS. 1 and 2) is replaced by a conducting blade 44 identical with blade 13 but comprising a resilient bent extension 44a similar to extension 13a which bears against the latter. A row 8 of self-stripping connection plugs 8a is provided together with the corresponding cutting blades 17. The means interconnecting the connection box 1 and the relevant protection box 2 consist of U-shaped conducting elements 46. A first arm 46' of each U-shaped conducting element 46 is introduced into one of the inlet orifices 16 provided between plugs 7a and 8a, for cooperating with its end with a pair of conducting blades 13a, 44a respectively. The other arm 46" of each U-shaped conducting element is connected to one of the terminals of the corresponding lightning arrester 26, incorporated in the protection box 2. The resilient conducting extension 25 is dispensed with and in this specific form of embodiment the terminal of lightning arrester 26 is clamped between the extension 24 and the second arm 46". The assembly constituting each U-shaped conducting element 46 is covered with a suitable insulating material 47 so as to be properly insulated, notably with respect to the connection plugs 7a and 8a. Each connecting wire 37 is connected to a plug 8a. All the other component elements are identical with those of the first form of embodiment (FIGS. 1 and 2 and 2a).

When only portion 2" of protection box 2 is removed, the lightning arresters 26 are eliminated, the electrical continuity being still maintained between each plug 8a and the corresponding two plugs 9a and 10a. If it is desired to eliminate completely the protection box 2, it is only necessary to separate the two boxes 1 and 2 in the direction of the arrow 40, to remove the U-shaped conducting element 46 and to plug in again the connection box 1 on its pair of conducting extensions 28. The protection box 2 may be replaced instantaneously with another connection box 1 identical with the first one.

Figure 5:
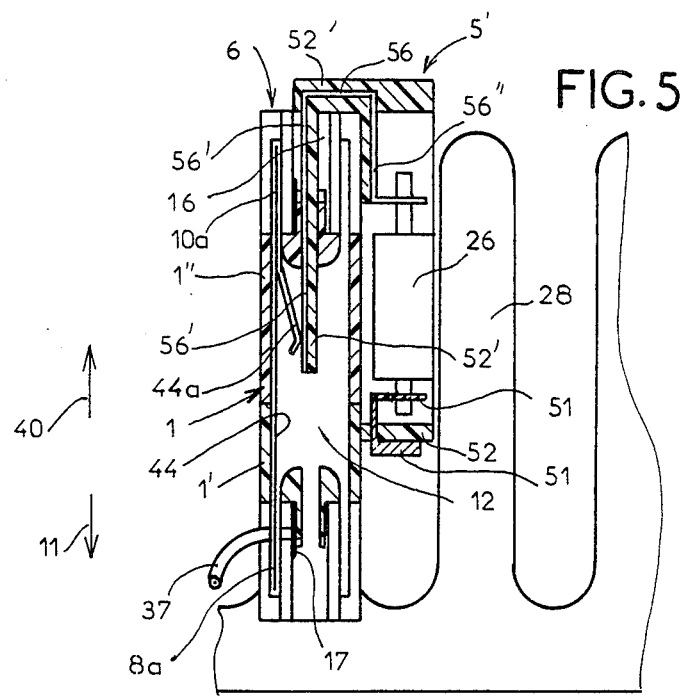
FIG. 5 illustrates in section similar to FIG. 1 a third form of embodiment of the invention.

In the third form of embodiment illustrated in FIG. 5, the protection box 2 is eliminated and replaced by a protection box 52 supported not by two conducting extensions 28, which remain therefore inoperative, but by the connection box 1 with which it is associated. The means for interconnecting boxes 1 and 52 consist of U-shaped conducting elements 56. Each first arem 56' of each element 56 is introduced into one of the inlet holes 16 provided along the second portion 1" of connection box 1. This first arm 56' bears against the extension 44a of a conducting blade 44 identical with the blade 44 of FIG. 4 which, in this specific example, is the only blade inserted into each passage 12. As in the preceding case illustrated in FIG. 4, a connecting wire 37 is clamped in each connection plug 8a. The protection box 52 is an insulating box containing a row of lightning arresters 26. Each lightning arrester 26 engages with a first end the second arm 56" of a U-shaped element 56 and with its other end an earthing blade 51 having an extension located under the plug 52.

All the above-mentioned U-shaped conducting elements 56 are supported by a single insulating box 52' adapted to cover jointly the corresponding sides 6 of connection box 1, and 5' of the protection box. In this form of embodiment, the single insulating box 52' consists of an extension of protection box 52 assembled therewith while constituting the means for securing this box 52 to connection box 1. In fact, this insulating box 52' extends in conjunction with the first arms 56' into the orifices 16. Thus, the protection box 52 is held in close contact with the corresponding connection box 1.

To dispense with the lightning arresters 26 it is only necessary to unplug the complete protection box 52 in the direction of the arrow 40. This protection box may be replaced immediately by a second connection box 1 plugged in side by side relationship on the two extensions 28 previously left free. The electrical continuity is obtained in this case through conducting blades 44 between plugs 8a and 10a, respectively.

Figure 6:
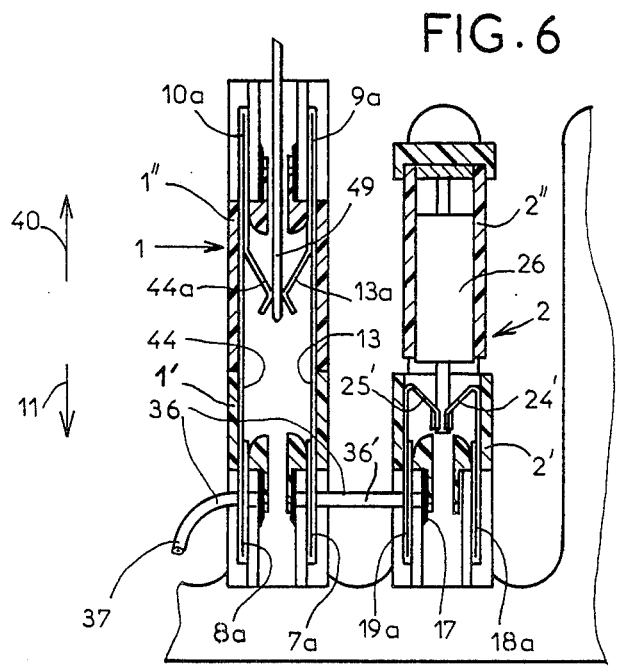
FIG. 6 illustrates in section similar to FIG. 1 a fourth form of embodiment of the invention.

The fourth form of embodiment of the invention (FIG. 6) comprises a connection box 1 identical with that of the second form of embodiment (FIG. 4) and a protection box 2 identical with that of the modified version of the first form of embodiment, illustrated in FIG. 3. The means for interconnecting these two boxes consist, as in the case of FIG. 3, of wire sections 36' each incorporated in the endmost section 36 of a connecting wire 37 provided for connecting the connection unit to the load network. Each wire section 36' is connected on the one hand to a self-stripping connection plug 19a connected in turn to the corresponding lightning arrester 26. The remaining portion of each endmost section 36 is connected to the corresponding plug 8a of connection box 1. In this form of embodiment, each connecting wire 37 will thus pass through the plugs 8a, 7a of connection box 1 before attaining the plugs 19a of the other case 2.

The electrical connection between plugs 8a and 7a is obtained through resilient extensions 44a and 13a. A test outlet 49 having one conducting face may for instance be introduced at will between the extensions 44a and 13a, for testing the lightning arresters 26 without disconnecting them. Even if the second portion 2'' of protection box 2 is removed with the lightning arrester 26 contained therein, the electrical continuity is assured between each plug 8a and the corresponding plugs 9a, 10a. The first portion 2' may be unplugged in the direction of the arrow 40 and replaced by a second connection box identical with box 1.

Figure 7:
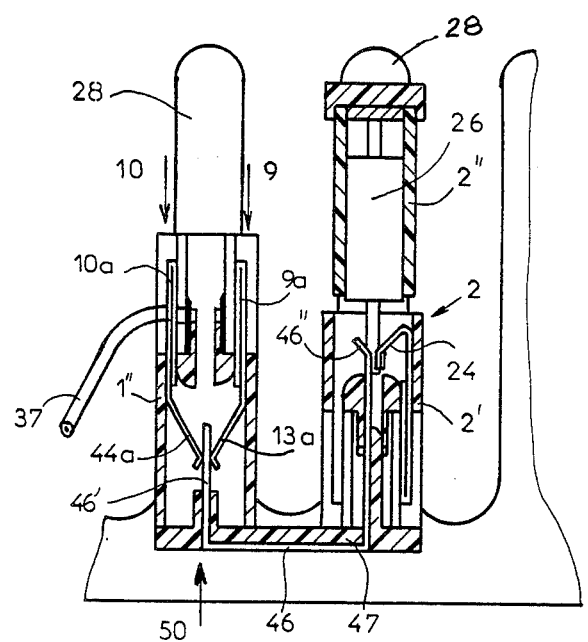
FIG. 7 illustrates in section similar to FIG. 1 a fifth form of embodiment of the invention.

The fifth form of embodiment illustrated in FIG. 7 is similar to the second form of embodiment (FIG. 4), but its structure is somewhat simplified. The protection box 2 is identical with that of FIG. 4, but the connection box consists only of the second portion 1'' of box 1 of the same FIG. 4. The row 50 of connection elements consists of the resilient conducting elements 13a, 44a, said row being disposed along the side opposite rows 9 and 10 of self-stripping plugs 9a, 10. Each first arm 46' of a U-shaped conducting element 46 cooperates directly with a connection element 13a, 44a, without passing through an inlet orifice 16, and the connecting wires 37 are connected to the self-stripping connection plugs 10a, respectively. All the other component elements are identical with those of the second form of embodiment (FIG. 4). As in this second form of embodiment each protection box 2 may be replaced immediately by a connection box such as the half-box 1''.

What is claimed is:

1. A connection unit for telecommunications lines, which comprises:
    at least one common support; and
    at least one insulating connection box, and at least one insulating protection box, the connection box and the protection box being removably mounted on the common support and extending transversely thereto, the connection box and the protection box being arranged in a side by side manner with respect to each other and being in spaced apart relationship so as to allow the connection box and the protection box to be interchanged with respect to their relative mounting positions on the common support;
    the connection box having a plurality of telecommunication line connection terminals mounted thereon and arranged in at least two rows, and internal connection means mounted therein for interconnecting connection terminals of one row with corresponding connection terminals of the other row so that telecommunication lines connected to terminals of one row may be electrically coupled to telecommunication lines connected to corresponding terminals of the other row;
    the protection box having a plurality of telecommunication line connection terminals mounted thereon and arranged in at least one row, and further including a plurality of individual line protecting means mounted therein for electrically protecting the telecommunications lines, each individual line protecting means being electrically coupled to a corresponding protection box connection terminal;
    the common support including a plurality of parallel upstanding extensions formed integrally thereon, the connection box and the protection box being removably mounted on respective upstanding extensions, wherein each of the connection box and the protection box is adapted to be removed from one upstanding extension and remounted on another extension to interchange the mounting positions of the connection box and the protection box on the common support.

2. A connection unit as defined by claim 1, wherein at least one of the connection terminals of the connection box and the protection box is an insulation type displacement terminal.

3. A connection unit as defined by claim 1, which further includes means for electrically connecting at least one telecommunication line connection terminal of the connection box with at least one telecommunication line connection terminal of the protection box.

4. A connection unit as defined by claim 1, wherein the protection box is formed of first and second interfitting sections, the first section of the protection box being mounted on the common support, the second section of the protection box being removably mounted on the first section of the protection box, the individual line protecting means being mounted to the second section of the protection box and being removable therewith, the protection box row of telecommunication line connection terminals being mounted on the first section of the protection box.

5. A connection unit as defined by claim 1, which further includes at least one U-shaped conducting element having at least two arms, one arm being received by an inlet hole formed in the connection box and being electrically coupled to the internal connection means of the connection box, and the other arm being at least partially received by the protection box and being electrically coupled to an individual line protecting means mounted therein.

6. A connection unit for telecommunication lines, which comprises:
    at least one common support;
    at least one insulating connection box, and at least one insulating protection box, the connection box being removably mounted on the common support and extending in a direction transverse thereto, the protection box being disposed parallel and adjacent to the connection box and being mounted on and supported by the connection box;
    means for supporting the protection box on the connection box, the supporting means including a lateral extension formed on an upper portion of the protection box;
    the connection box having a plurality of telecommunication line connection terminals mounted thereon and arranged in at least two rows, and internal connection means mounted therein for interconnecting connection terminals of one row with corresponding connection terminals of the other row so that telecommunication lines connected to terminals of one row may be electrically coupled to telecommunication lines connected to corresponding terminals of the other row;

the protection box including a plurality of individual line protecting means mounted therein for electrically protecting the telecommunication lines; and means for electrically interconnecting the protection box with the connection box, the electrical interconnecting means including a plurality of U-shaped conducting elements, each element having interconnected first and second arms, the first arm of each element being received by an opening formed in the connection box and being electrically coupled to the internal connection means of the connection box, and the second arm of each element being at least partially received by the protection box and being electrically coupled to a respective individual line protecting means mounted therein;

the common support including a plurality of parallel upstanding extensions formed integrally thereon, the connection box and protection box mounted thereon being removably mounted on one of the upstanding extensions, wherein the connection box and the protection box together are adapted to be removed from one upstanding extension and remounted on another upstanding extension to change the mounting position of the connection box and the protection box on the common support.

* * * * *